(12) United States Patent
Guo et al.

(10) Patent No.: US 12,395,218 B2
(45) Date of Patent: Aug. 19, 2025

(54) METHOD AND APPARATUS FOR BEAM MANAGEMENT ON SIDELINK

(71) Applicant: Lenovo (Beijing) Ltd., Beijing (CN)

(72) Inventors: Xin Guo, Beijing (CN); Haipeng Lei, Beijing (CN); Zhennian Sun, Beijing (CN); Xiaodong Yu, Beijing (CN); Haiming Wang, Beijing (CN)

(73) Assignee: Lenovo (Beijing) Ltd., Beijing (CN)

( * ) Notice: Subject to any disclaimer, the term of this patent is extended or adjusted under 35 U.S.C. 154(b) by 432 days.

(21) Appl. No.: 17/917,777

(22) PCT Filed: Apr. 14, 2020

(86) PCT No.: PCT/CN2020/084760
§ 371 (c)(1),
(2) Date: Oct. 7, 2022

(87) PCT Pub. No.: WO2021/207935
PCT Pub. Date: Oct. 21, 2021

(65) Prior Publication Data
US 2023/0140393 A1 May 4, 2023

(51) Int. Cl.
*H04B 7/06* (2006.01)
*H04W 16/28* (2009.01)
(52) U.S. Cl.
CPC ......... *H04B 7/0626* (2013.01); *H04B 7/0617* (2013.01); *H04W 16/28* (2013.01)

(58) Field of Classification Search
CPC ............... H04B 7/0626; H04B 7/0617; H04B 7/06966; H04B 7/0695; H04B 7/088; H04W 16/28; H04W 92/18; H04W 76/14
See application file for complete search history.

(56) References Cited

U.S. PATENT DOCUMENTS 10,578,732 B2    3/2020  Jiang et al.
2018/0098299 A1* 4/2018  Chae ....................... H04J 11/00

FOREIGN PATENT DOCUMENTS

CN    109644455 A    4/2019
WO    2020032203 A1   2/2020

OTHER PUBLICATIONS

Convida Wireless, "Discussion on Sidelink Procedures", 3GPP TSG-RAN WG1 Meeting #97, R1-1907465, Reno, USA [retrieved Nov. 2, 2022]. Retrieved from the Internet <https://www.3gpp.org/ftp/tsg_ran/WG1_RL1/TSGR1_97/Docs?sortby=namerev>., May 2019, 3 Pages.

(Continued)

*Primary Examiner* — Michael K Phillips
(74) *Attorney, Agent, or Firm* — FIG. 1 Patents (57) ABSTRACT

Embodiments of the present application are directed to a method and apparatus for beam management on sidelink. A method for wireless communication performed by a first user equipment (UE) is disclosed, the method may include: transmitting, to a second UE, an index indicating channel state information (CSI) reporting configuration information including a CSI reporting configuration item, wherein a type of CSI reporting is set in the index; and transmitting information of candidate beams of the first UE when the type of CSI reporting is set as round-trip in the index.

20 Claims, 4 Drawing Sheets

(56) References Cited

OTHER PUBLICATIONS

OPPO , "Discussion of RLM for Unicast", 3GPP TSG RAN WG1 #98bis, R1-1910376, Chongqing, China [retrieved Nov. 2, 2022]. Retrieved from the Internet <https://www.3gpp.org/ftp/tsg_ran/WG1_RL1/TSGR1_98b/Docs>., Oct. 2016, 3 Pages.
PCT/CN2020/084760 , "International Preliminary Report on Patentability", PCT Application No. PCT/CN2020/084760, Oct. 27, 2022, 5 pages.
PCT/CN2020/084760 , "International Search Report and Written Opinion", PCT Application No. PCT/CN2020/084760, Jan. 14, 2021, 6 pages.

* cited by examiner

METHOD AND APPARATUS FOR BEAM MANAGEMENT ON SIDELINK

TECHNICAL FIELD

The present application generally relates to wireless communication technology, and especially to Channel State Information (CSI) Measurement and reporting for beam management on sidelink.

BACKGROUND

In a wireless communication system, a user equipment (UE) (e.g., mobile device) may communicate with another UE via a data path of an operator network. The data path of the operator network may include a base station (BS) and gateways.

In the case that a UE and another UE are relatively close to each other, a radio link or a sidelink can be established to provide Device-to-Device (D2D) communication. The term "sidelink" refers to a direct radio link for communication among devices, as opposed to communication via the cellular infrastructure (uplink and downlink) as discussed above. The "sidelink" is also referred to as a D2D link. D2D communication may be used in any suitable telecommunication network in accordance with various standards. The network may configure a resource pool that may perform the D2D operation to the UE.

D2D operation may provide various advantages, for example, a relatively high transfer rate, a relatively low delay, etc. Moreover, in D2D operation, traffic concentrated on a base station can be distributed. Furthermore, D2D UE may function as a relay to extend coverage of a base station.

D2D communication evolves into vehicle-to-anything (V2X) communication in the Long Term Evolution (LTE) sidelink, and has been introduced into 5G wireless communication technology. V2X communications encompass communications involving vehicles as message sources or destinations. Sidelink enables a direct communication between UEs in proximity, and data does not need to go through a BS or a core network.

To meet the ever increasing Quality of Service (QOS) requirements for the V2X communication, operating in the millimeter wave (mmWave) band or even terahertz (THz) band becomes a promising solution, since the above frequencies are expected to provide high capacity and support connections of high data rate as well as delay-sensitive data exchange. Although mmWave/THz communication is very attractive from the data throughput perspective, it creates challenges for the physical layer. Due to high propagation loss, the use of mmWave/THz bands is deemed suitable for mainly short range (a few hundred meters) and point-to-point Line Of Sight (LoS) communications. To maintain the desired communication range, operating in mmWave/THz bands is assumed to use directional antenna systems to compensate the greater propagation losses. Hence, efficient beam management method is required for V2X sidelink systems operating in mmWave/THz bands.

SUMMARY OF THE APPLICATION

Embodiments of the present application provide a method and apparatus for CSI measurement and reporting for beam management on sidelink.

An embodiment of the present application provides a method for wireless communication performed by a first UE, wherein the method includes: transmitting, to a second UE, an index indicating channel state information (CSI) reporting configuration information including a CSI reporting configuration item, wherein a type of CSI reporting is set in the index; and transmitting information of candidate beams of the first UE when the type of CSI reporting is set as round-trip in the index.

Another embodiment of the present application provides a method for wireless communication performed by a first UE, wherein the method includes: receiving, from a second UE, an index indicating CSI reporting configuration information including a CSI reporting configuration item, wherein a type of CSI reporting is set in the index; and in response to the type of CSI reporting is set as round-trip in the index, receiving information of candidate beams of the second UE.

Another embodiment of the present application provides an apparatus, wherein the apparatus includes: at least one non-transitory computer-readable medium having computer executable instructions stored therein; at least one receiver; at least one transmitter; and at least one processor coupled to the at least one non-transitory computer-readable medium, the at least one receiver and the at least one transmitter; wherein the computer executable instructions are programmed to implement a method with the at least one receiver, the at least one transmitter and the at least one processor, wherein the method includes: transmitting, to a UE, an index indicating a channel state information (CSI) reporting configuration item, wherein a type of CSI reporting is set in the index; and transmitting information of candidate beams of the apparatus when the type of CSI reporting is set as round-trip in the index.

Another embodiment of the present application provides an apparatus, wherein the apparatus includes: at least one non-transitory computer-readable medium having computer executable instructions stored therein; at least one receiver; at least one transmitter; and at least one processor coupled to the at least one non-transitory computer-readable medium, the at least one receiver and the at least one transmitter; wherein the computer executable instructions are programmed to implement a method with the at least one receiver, the at least one transmitter and the at least one processor, wherein the method includes: receiving, from a UE, an index indicating a CSI reporting configuration item, wherein a type of CSI reporting is set in the index; and in response to the type of CSI reporting is set as round-trip in the index, receiving information of candidate beams of the UE.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G. It is contemplated that along with developments of network architectures and new service scenarios, all embodiments in the present application are also applicable to similar technical problems; and moreover, the terminologies recited in the present application may change, which should not affect the principle of the present application.

Figure 1:
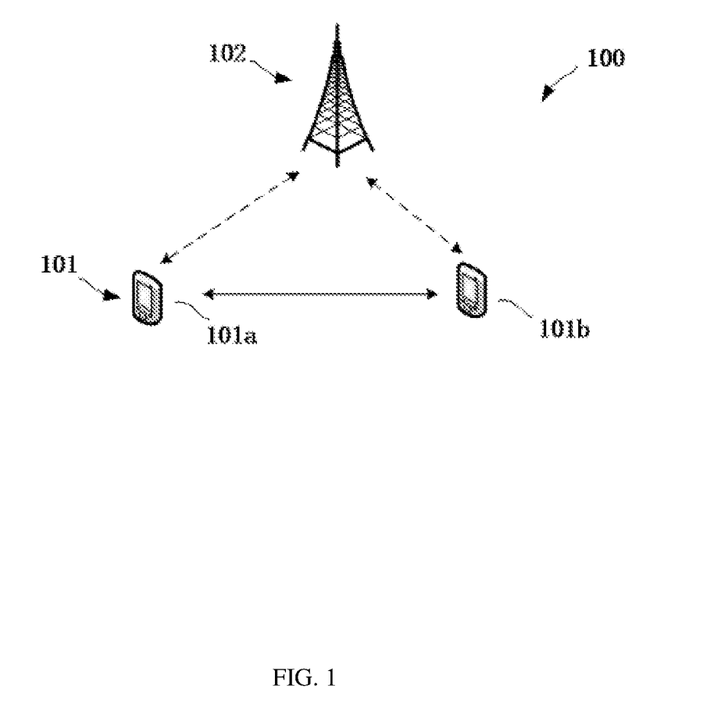
FIG. 1 illustrates a schematic diagram of a wireless communication system in accordance with some embodiments of the present application.

FIG. 1 illustrates a schematic diagram of a wireless communication system in accordance with some embodiments of the present application.

As shown in FIG. 1, a wireless communication system 100 includes at least one user equipment (UE) 101 and at least one base station (BS) 102. In particular, the wireless communication system 100 includes two UEs 101 (e.g., UE 101a and UE 101b) and one BS 102 for illustrative purpose. Although a specific number of UEs 101 and BS 102 are depicted in FIG. 1, it is contemplated that any number of UEs 101 and BSs 102 may be included in the wireless communication system 100.

The UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to some embodiments of the present application, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network.

In some embodiments of the present application, UE is pedestrian UE (P-UE or PUE) or cyclist UE. In some embodiments of the present application, the UE(s) 101 includes wearable devices, such as smart watches, fitness bands, optical head-mounted displays, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE(s) 101 may communicate directly with BSs 102 via LTE or NR Uu interface.

In some embodiments of the present application, each of the UE(s) 101 may be deployed an IoT application, an eMBB application and/or a URLLC application. For instance, UE 101a may implement an IoT application and may be named as an IoT UE, while UE 101b may implement an eMBB application and/or a URLLC application and may be named as an eMBB UE, an URLLC UE, or an eMBB/URLLC UE. It is contemplated that the specific type of application(s) deployed in the UE(s) 101 may be varied and not limited.

According to some embodiments of FIG. 1, UE 101a functions as Tx UE, and UE 101b functions as Rx UE. UE 101a may exchange V2X messages with UE 101b through a sidelink, for example, PC5 interface as defined in 3GPP TS 23.303. UE 101a may transmit information or data to other UE(s) within the V2X communication system, through sidelink unicast, sidelink groupcast, or sidelink broadcast. For instance, UE 101a transmits data to UE 101b in a sidelink unicast session. UE 101a may transmit data to UE 101b and other UEs in a groupcast group (not shown in FIG. 1) by a sidelink groupcast transmission session. Also, UE 101a may transmit data to UE 101b and other UEs (not shown in FIG. 1) by a sidelink broadcast transmission session.

Alternatively, according to some other embodiments of FIG. 1, UE 101b functions as Tx UE and transmits V2X messages, UE 101a functions as Rx UE and receives the V2X messages from UE 101b.

Both UE 101a and UE 101b in the embodiments of FIG. 1 may transmit information to BS 102 and receive control information from BS 102, for example, via LTE or NR Uu interface. BS(s) 102 may be distributed over a geographic region. In certain embodiments of the present application, each of BS(s) 102 may also be referred to as an access point, an access terminal, a base, a base unit, a macro cell, a Node-B, an evolved Node B (eNB), a gNB, a Home Node-B, a relay node, or a device, or described using other terminology used in the art. The BS(s) 102 is generally a part of a radio access network that may include one or more controllers communicably coupled to one or more corresponding BS(s) 102.

The wireless communication system 100 may be compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3GPP-based network, a 3GPP 5G network, a satellite communications network, a high altitude platform network, and/or other communications networks.

In some embodiments of the present application, the wireless communication system 100 is compatible with the 5G NR of the 3GPP protocol, where BS(s) 102 transmit data using an OFDM modulation scheme on the downlink (DL) and the UE(s) 101 transmit data on the uplink (UL) using a Discrete Fourier Transform-Spread-Orthogonal Frequency Division Multiplexing (DFT-S-OFDM) or cyclic prefix-OFDM (CP-OFDM) scheme. More generally, however, the wireless communication system 100 may implement some other open or proprietary communication protocols, for example, WiMAX, among other protocols.

In some embodiments of the present application, BS(s) 102 may communicate using other communication protocols, such as the IEEE 802.11 family of wireless communication protocols. Further, in some embodiments of the present application, the BS(s) 102 may communicate over licensed spectrums, whereas in other embodiments, the BS(s) 102 may communicate over unlicensed spectrums. The present application is not intended to be limited to the implementation of any particular wireless communication system architecture or protocol. In yet some embodiments of present application, BS(s) 102 may communicate with UE(s) 101 using the 3GPP 5G protocols.

In CSI report timing mechanisms, the duration from CSI-RS transmission to CSI reporting and success of CSI-reporting may be impacted heavily by available resource.

Regarding Sidelink CSI Reporting MAC CE, in order to avoid reporting an outdated CQI/RI, CQI/RI may need to be sent within a latency bound subject to the availability of its transmission (e.g., prioritization, congestion control, etc.). The latency bound for Sidelink CSI Reporting MAC CE may be configurable within a range of 3 to 20 ms, expressed in slots. Any MAC CE based reporting of CQI/RI may follow the same procedure in terms of sidelink resource allocation framework, i.e. it is expected to be transparent to the physical layer.

Accordingly, there is this issue: how to reduce time duration required by CSI measurement based beam management (such as beam adjustment or beam re-evaluation) of SL and thus adapt to a rapid change in the communication environment, for example, caused by movements of vehicle UEs.

In the case of cellular (Uu) communication with directional antennas operating in mmWave bands, once an initial beam pair has been established, there is a need to regularly re-evaluate the selection of transmitter-side and receiver-side beam directions due to movements and rotations of the mobile device. Compared to Uu, (V2X) sidelink communication will suffer from even more dramatic change in the communication environment caused by movements of vehicle UEs associated with the beam pair of interest or by movements of surrounding vehicle UEs. Thus, how to adapt the beam to rapid change in the communication environment should be addressed.

The present application proposes a sidelink beam adjustment mechanism, signaling procedures, and UE behaviors. The proposed technical solutions reduce time duration required by beam management, which is based on CSI measurement and reporting.

When both Tx UE and Rx UE are in Mode 2, a round-trip CSI-RS measurement and reporting may be configured and triggered by Tx UE. Wherein, in Mode 2, UE may autonomously select resource(s) for a sidelink communication. Reporting resource may be selected by Rx UE. The procedure of beam establishment over sidelink is provided as follows.

In some embodiments, the reporting of UE capability is triggered by an indicator from Tx UE in the case that sidelink connection is established between Tx UE and Rx UE, the Tx UE may transmit an indicator to trigger a beam establishment procedure first. Such an indictor may be conveyed by SCI or MAC CE to an Rx UE.

In some embodiments, the UE capability includes at least one of "time duration for Quasi-Co-Location (QCL) of sidelink (timeDurationForQCL-SL)" and "beam correspondence of sidelink (beamCorrespondence-SL)". Exemplary explanations of timeDurationForQCL-SL and beamCorrespondence-SL are shown in Table 1. Persons skilled in the art may expand or limit the definition of timeDurationForQCL-SL and beamCorrespondence-SL based on actual needs.

In some embodiments, the Tx UE may also transmit its UE ability report and/or geolocation information with the indicator. Next, upon receiving the indicator for triggering the beam establishment procedure, the Rx UE may report its information of UE capability. Such a report may be conveyed by SCI or MAC CE.

Rx UE may perform initial Rx beam selection. The Rx beam selection may be based on a boresight direction towards the Tx UE, which may be calculated by the geolocation information of the Tx UE and that of Rx UE. In some embodiment, the initial Rx beam selection includes initial panel selection in case that there are several panels. Rx UE may also transmit its geolocation information to Tx UE for initial Tx beam selection.

Upon receiving the information reported from the Rx UE, the Tx UE may perform initial Tx beam selection. The initial Tx beam selection may be performed upon receiving the report from the Rx UE. The Tx beam selection may be based on a boresight direction towards the Rx UE, which may be calculated by the geolocation information of the Tx UE and that of Rx UE. In some embodiment, the initial Tx beam selection includes initial panel selection in case that there are several panels. Tx UE may configure a SL CSI-RS resource and reporting configuration to the Rx UE via SL RRC signaling.

In some embodiments, report of UE capability, for example, timeDurationForQCL-SL and/or beamCorrespondence-SL, may also be performed during SL connection stage. For example, once the SL connection is established between Tx UE and Rx UE, information of UE capability of Rx UE may be reported from Rx UE to Tx UE. Information of UE capability of Tx UE may also be reported from Tx UE to Ux UE. Such a report may be conveyed by MAC CE or SCI. SL CSI-RS resource and reporting configuration may be transmitted to the Rx UE via PC5-RRC signaling.

In some embodiments that the carrier conveying the configuration of SL CSI-RS resource and reporting can be different from or same as the carrier for beam transmission. In some embodiments, the transmission of the configuration of SL CSI-RS resource and reporting can be done without beam transmission.

TABLE 1

| Parameter | Description |
| --- | --- |
| timeDurationForQCL-SL | Defines minimum number of OFDM symbols required by the UE to perform PSCCH reception and applying spatial QCL information received in SCI for PSSCH processing. UE shall indicate one value of the minimum number of OFDM symbols per each subcarrier spacing supported in selected resource pool. |
| beamCorrespondence-SL | A suitable transmitter/receiver beam pair for one sidelink transmission direction will also be a suitable beam pair for the opposite transmission direction and vice versa. This is referred to as beam correspondence over sidelink. If a UE supports beam correspondence over sidelink, corresponding value will be set in the beamCorrespondence-SL. |

Figure 2:
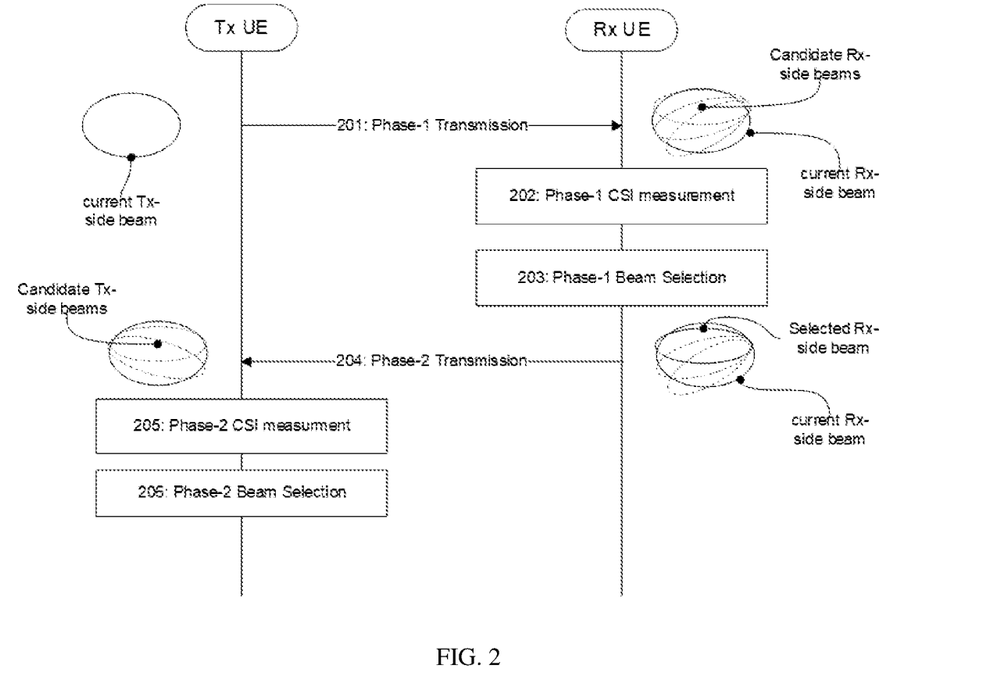
FIG. 2 illustrates an exemplary procedure of round-trip CSI-RS measurement and reporting in accordance with some embodiments of the present application.

FIG. 2 illustrates an exemplary procedure of round-trip CSI-RS measurement and reporting. The procedure of beam adjustment may be triggered periodically or by events. The events may include: detected quality degradation, adjust cast-type (e.g. from unicast to groupcast), request by other UE, etc.

In step 201, Tx UE may transmit an indicator to trigger round-trip CSI-RS measurement. Tx UE may further transmit CSI RS. A pre-condition may need to meet that SL CSI reporting is enabled by higher layer signaling. In some embodiments, the indicator may be transmitted via SCI, and CSI-RS may be transmitted in the PSSCH transmission corresponding to the SCI. The SCI and corresponding PSSCH may be transmitted via current Tx-side beam. If beam correspondence over sidelink is supported, the current Tx-side beam may work also as Rx beam for the Tx-side. If this procedure occurs upon initial beam establishment, then the current Tx-side beam is the selected initial beam. Otherwise, the current Tx-side beam means the Tx beam currently used by the Tx UE. In some embodiments, a SL Transmission Configuration Index (SL-TCI) State table may be defined in frequency resource, such as carrier, BWP, resource pool for sidelink communication, and so on. UE may select a subset of the tables from SL-TCI as candidate Tx/Rx beams. Thus, the ultimately selected beam(s) will be within the range confined by SL-TCI.

In some embodiments, a time duration no less than timeDurationForQCL-SL of the Rx UE should be guaranteed between the SCI and the first CSI-RS locating in the corresponding PSSCH.

Tx UE may also transmit index(es) corresponding to CSI reporting configuration information in step 201. Wherein the CSI reporting configuration information includes one or more CSI reporting configuration items. The index(es) may be transmitted in SCI. The CSI reporting configuration information may include the set of Phase-1 SL CSI-RSs (transmission instants) to measure on. The set of Phase-1 SL CSI-RSs may correspond to the set of beams, which may be included in the NZP-CSI-RS resource set associated with the CSI reporting configuration information. The CSI reporting configuration information may also include the measurement quantity, which may include Layer-1 Reference Signal Received Power (L1-RSRP) on the SL CSI-RS. The CSI reporting configuration information may further include repetition filed, which may be set to indicate a Tx-side beam sweeping or an Rx-side beam sweeping. The CSI reporting configuration information may include a type of CSI reporting. In some embodiments, if a type of CSI reporting is set as round-trip, the information of candidate Tx-side beams to be measured in Phase-2 SL CSI measurement, for example, the number and information (SL-TCI) of candidate Tx-side beams, may be indicated. In some embodiments, the index in which a type of CSI reporting is indicated may be used as the indicator to trigger round-trip SL CSI-RS measurement. The CSI reporting configuration information may further include a latency bound for Sidelink CSI Reporting. In order to avoid reporting an outdated CSI, CSI reporting needs to be sent within a latency bound subject to the availability of its transmission. The latency bound for Sidelink CSI Reporting may be configurable within a range of 3 to 20 ms, expressed in slots and may also indicated in the phase-1 transmission. The latency bound can be conveyed such as in the SCI.

When the phase-1 transmission containing resource(s) for CSI-RS(s) is received, Rx UE may receive the CSI-RS(s) according to the indication of the resource(s) and perform measurement on the CSI-RS(s) with Rx-side candidate beams in step 202. In some embodiments, the Rx UE may do a beam sweep to measure on the CSI-RS(s) in sequence over the Rx-side candidate beams.

For example, the Rx UE may sense and detect the SCI via its current Rx-side beam. Upon SCI is detected, the Rx UE will perform Phase-1 SL CSI measurement on the CSI-RSs with a set of candidate Rx-side beams. The measurement may be based on the SL CSI report configuration indicated in the SCI.

In some embodiments, the candidate Rx-side beams in Phase-1 CSI process may be determined based on the candidate Tx-side beams in Phase-2 CSI process, which may be indicated in the detected SCI.

Once the measurement is finished, the Rx UE may perform Phase-1 beam selection within the set of candidate Rx-side beams based on the measurement results in step 203, for example, selecting the beam with the best measured L1-RSRP. The Rx UE may also select resource for the Phase-1 SL CSI reporting subject to constraint of latency bound specified in the SCI in this step.

In step 204, Rx UE may transmit Phase-1 CSI report. Rx UE may also transmit Phase-2 CSI RS in step 204 when the type of CSI reporting is set as round-trip in the index(s). In some embodiments, Phase-1 CSI report may be transmitted via MAC CE, and Phase-2 CSI-RS(s) may be transmitted in the PSSCH transmission. In some embodiments, a time duration no less than timeDurationForQCL-SL of the Tx should be guaranteed between the associated SCI and the first CSI-RS of Phase-2 CSI-RS(s) locating in the corresponding PSSCH.

In the SL CSI report, the Rx UE may indicate the SL-TCI associated with the selected Rx-side beam to the Tx UE. The Phase-2 CSI-RS(s) may be transmitted via the selected Rx-side beam. In some embodiments, the SCI associated with the PSSCH for the Phase-2 CSI-RS(s) may be transmitted via the current Rx-side beam.

In round-trip CSI reporting, Tx UE may receive Phase-1 CSI report and Phase-2 CSI RS, and perform measurement on the CSI-RS(s) with pre-determined Tx-side candidate beams in step 205. In some embodiments, the Tx UE may do a beam sweep to measure on the CSI-RS(s) in sequence over the Tx-side candidate beams.

For example, The Tx UE may sense and detect the SCI via its current Tx-side beam. Upon the SCI is detected, the Tx UE will carry out Phase-2 SL CSI measurement on the CSI-RSs with the pre-determined candidate Tx-side beams.

Once the measurement is finished, the Tx UE may perform Phase-2 beam selection within the set of candidate Tx-side beams based on the measurement results in step 206, for example, selecting the beam with the best measured L1-RSRP.

In some embodiments, when Tx UE is in mode 1 and Rx UE is in mode 2, the procedures are substantially the same as those described above except that the resource to transmit Phase-1 SL CSI-RS is scheduled by gNB, and the resource to transmit Phase-2 SL CSI-RS is selected by the Rx UE. Wherein, in Mode 1, network schedules resource(s) for a sidelink communication.

In some embodiments, when Tx UE is in mode 2 and Rx UE is in mode 1, the procedures are substantially the same as those described above except that the resource to transmit Phase-1 SL CSI-RS is scheduled by gNB, and the resource to transmit Phase-2 SL CSI-RS is selected by the Tx UE.

In some embodiments, when Tx UE and Rx UE are both in mode 1, the procedures are substantially the same as those described above except that the resources to transmit Phase-1 SL CSI-RS and Phase-2 SL CSI-RS are both scheduled by gNB.

Figure 3:
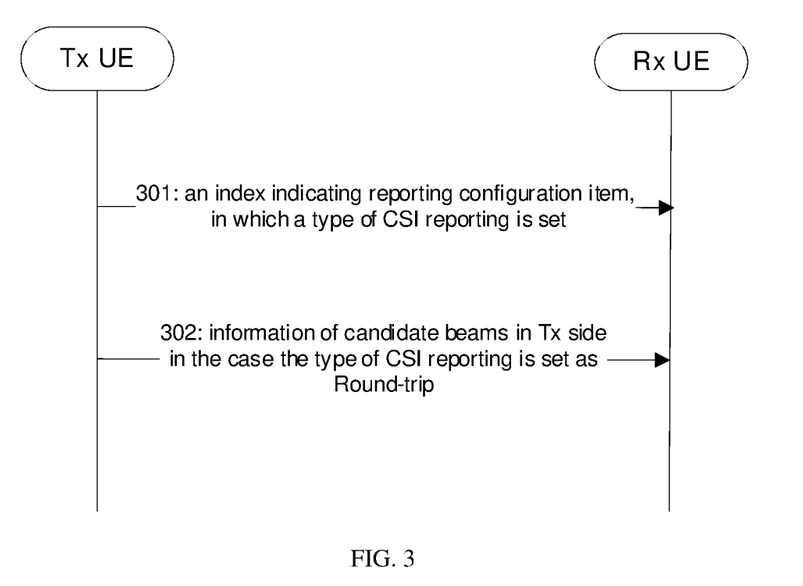
FIG. 3 illustrates an exemplary flow chart illustrating a CSI reporting procedure in accordance with some embodiments of the present application.

FIG. 3 is an exemplary flow chart showing a CSI reporting procedure in accordance with some embodiments of the present application.

In step 301, Tx UE transmits to Rx UE an index indicating CSI reporting configuration item, in which a type of CSI reporting is set. In case that the type of CSI reporting is set as round-trip in the index, Tx also transmits to Rx UE information of candidate beams in step 302. In some embodiments, this procedure as shown in FIG. 3 may be part of the Phase-1 transmission of step 201 as shown in FIG. 2.

In a round-trip CSI-RS measurement and reporting mechanism, for example, as shown in FIG. 2, Rx UE side beam adjustment is carried out during the phase-1 SL CSI-RS transmission, while Tx UE side beam adjustment is carried out during the phase-1 SL CSI reporting, with which phase-2 SL CSI-RS is transmitted. In sidelink, the resource for CSI reporting is determined by Rx UE. Thus, the duration from CSI-RS transmission to CSI reporting and success ratio of CSI-reporting is impacted heavily by available resource. The simplified CSI-RS measurement and reporting procedure according to some embodiments of the present application may increase the success ratio of CSI-reporting based beam adjustment for both Tx UE side and Rx UE side.

Information of candidate Tx-side beams to be measured in Phase-2 is transmitted with Phase-1 SL CSI-RS for the Rx UE to determine its candidate Rx-side beams in a proposed round-trip CSI reporting. If Tx UE need to adjust its beam to one within the candidate Tx side beams (e.g. due to resource selection), information of such candidate beams will facilitate the Rx UE to quickly identify suitable candidate Rx side beams corresponding to the candidate Tx side beams and decrease measurement consumption.

Figure 4:
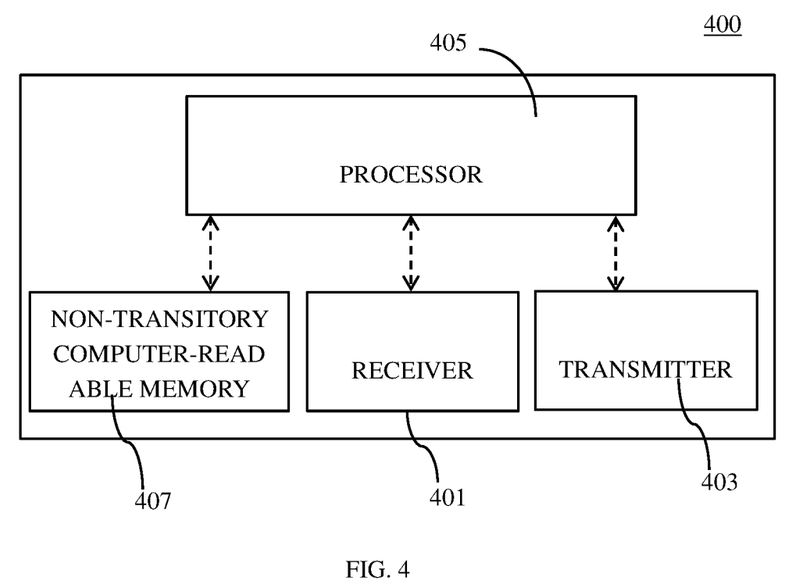
FIG. 4 illustrates an apparatus according to some embodiments of the present application.

FIG. 4 illustrates an apparatus according to some embodiments of the present application. In some embodiments of the present disclosure, the apparatus 400 may be UE 101a or UE 101b illustrated in FIG. 1 or the UE in other embodiments of the present application.

As shown in FIG. 4, the apparatus 400 may include a receiver 401, a transmitter 403, a processor 405, and a non-transitory computer-readable medium 407. The non-transitory computer-readable medium 407 has computer executable instructions stored therein. The processer 405 is configured to be coupled to the non-transitory computer readable medium 407, the receiver 401, and the transmitter 403. It is contemplated that the apparatus 400 may include more computer-readable mediums, receiver, transmitter and processors in some other embodiments of the present application according to practical requirements. In some embodiments of the present application, the receiver 401 and the transmitter 403 are integrated into a single device, such as a transceiver. In certain embodiments, the apparatus 400 may further include an input device, a memory, and/or other components.

In some embodiments of the present application, the non-transitory computer-readable medium 407 may have stored thereon computer-executable instructions to cause a processor to implement the above methods according to embodiments of the present application.

Persons skilled in the art should understand that as the technology develops and advances, the terminologies described in the present application may change, and should not affect or limit the principle and spirit of the present application.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A method for wireless communication performed by a first user equipment (UE), comprising:
   transmitting, to a second UE, an index indicating channel state information (CSI) reporting configuration information including a CSI reporting configuration item, wherein a type of CSI reporting is set in the index; and
   transmitting information of candidate beams of the first UE when the type of CSI reporting is set as round-trip in the index.

2. The method of claim 1, wherein CSI measurement is triggered by transmitting a first indicator or is triggered by the transmitting of the index.

3. The method of claim 1, further comprising:
   transmitting, to the second UE, one or more CSI-RS.

4. An apparatus, comprising:
   a receiver;
   a transmitter; and
   a processor coupled to the receiver and the transmitter configured to cause the apparatus to, wherein the apparatus comprises a first user equipment (UE):
      transmit, to a second UE, an index indicating channel state information (CSI) reporting configuration information including a CSI reporting configuration item, wherein a type of CSI reporting is set in the index; and transmit information of candidate beams of the apparatus when the type of CSI reporting is set as round-trip in the index.

5. The apparatus of claim 4, wherein when the type of CSI reporting is set as round-trip in the index, the processor, the receiver and the transmitter are further configured to cause the apparatus to:
receive a first CSI report and second one or more CSI-RS;
perform measurement on the received second one or more CSI-RS with the candidate beams; and
select a beam within the candidate beams based on measurement results.

6. The apparatus of claim 5, wherein to perform measurement on the received second one or more CSI-RS with the candidate beams comprises doing a beam sweep to measure on the received second CSI-RS in sequence over the candidate beams.

7. The apparatus of claim 4, wherein the processor, the receiver and the transmitter are further configured to cause the apparatus to:
transmit a second indicator to trigger a beam establishment procedure and a report of UE capability of the apparatus; and
receive a report of UE capability of the second UE from the second UE.

8. The apparatus of claim 4, wherein the processor, the receiver and the transmitter are further configured to cause the apparatus to:
transmit a report of UE capability of the apparatus; and
receive a report of UE capability of the second UE from the second UE.

9. The apparatus of claim 4, wherein the processor, the receiver and the transmitter are further configured to cause the apparatus to:
transmit geolocation information of the apparatus;
receive geolocation information of the second UE; and
select an initial beam as a current beam of the apparatus based on the geolocation information of the apparatus and the received geolocation information of the second UE.

10. The apparatus of claim 9, wherein to select the initial beam comprises selecting an initial panel.

11. An apparatus, comprising:
at least one non-transitory computer-readable medium having computer executable instructions stored therein;
a receiver;
a transmitter; and
a processor coupled to the receiver and the transmitter configured to cause the apparatus to, wherein the apparatus comprises a first user equipment (UE):
receive, from a second UE, an index indicating CSI reporting configuration information including a CSI reporting configuration item, wherein a type of CSI reporting is set in the index; and
in response to the type of CSI reporting is set as round-trip in the index, receive information of candidate beams of the second UE.

12. The apparatus of claim 11, wherein CSI measurement is triggered by receiving a first indicator from the second UE or is triggered by the index.

13. The apparatus of claim 11, wherein the processor, the receiver and the transmitter are further configured to cause the apparatus to:
receive first one or more CSI-RS;
perform measurement on the first one or more CSI-RS with candidate beams of the apparatus; and
select a beam based on measurement results.

14. The apparatus of claim 11, wherein the processor, the receiver and the transmitter are further configured to cause the apparatus to:
receive a second indicator for triggering a beam establishment procedure and a report of UE capability of the second UE; and
in response to the received second indicator, transmit a report of UE capability of the apparatus to the second UE.

15. The apparatus of claim 11, wherein the processor, the receiver and the transmitter are further configured to cause the apparatus to:
receive a report of UE capability of the second UE from the second UE; and
transmit a report of UE capability of the apparatus to the second UE.

16. The apparatus of claim 11, wherein the processor, the receiver and the transmitter are further configured to cause the apparatus to:
receive geolocation information of the second UE;
select an initial beam as a current beam of the apparatus based on the geolocation information of the apparatus and the received geolocation information of the second UE; and
transmit geolocation information of the apparatus.

17. The apparatus of claim 4, wherein the processor, the receiver and the transmitter are further configured to cause the apparatus to:
transmit, to the second UE, first one or more CSI-RS.

18. The apparatus of claim 17, wherein CSI measurement is triggered by transmitting a first indicator or is triggered by the transmitting of the index.

19. The apparatus of claim 18, wherein the first indicator or the index for triggering CSI measurement is transmitted via sidelink control information (SCI), and first one or more CSI-RS is transmitted in physical sidelink share channel (PSSCH) corresponding to the SCI.

20. The apparatus of claim 17, wherein the first one or more CSI-RS is respectively transmitted via one or more resources selected by the apparatus, or via one or more resources scheduled by a base station or another UE.

* * * * *